No. 760,480. PATENTED MAY 24, 1904.
J. S. PECK & J. W. FARLEY.
SYSTEM OF ELECTRICAL DISTRIBUTION.
APPLICATION FILED JULY 3, 1903.
NO MODEL.

WITNESSES:
C. L. Belcher
F. H. Miller

INVENTORS
John S. Peck
Joseph W. Farley
BY
Wesley L. Carr
ATTORNEY

No. 760,480. Patented May 24, 1904.

UNITED STATES PATENT OFFICE.

JOHN S. PECK, OF PITTSBURG, AND JOSEPH W. FARLEY, OF EAST PITTSBURG, PENNSYLVANIA, ASSIGNORS TO WESTINGHOUSE ELECTRIC & MANUFACTURING COMPANY, A CORPORATION OF PENNSYLVANIA.

SYSTEM OF ELECTRICAL DISTRIBUTION.

SPECIFICATION forming part of Letters Patent No. 760,480, dated May 24, 1904.

Application filed July 3, 1903. Serial No. 164,145. (No model.)

*To all whom it may concern:*

Be it known that we, JOHN S. PECK, a resident of Pittsburg, and JOSEPH W. FARLEY, a resident of East Pittsburg, in the county of Allegheny and State of Pennsylvania, citizens of the United States, have invented a new and useful Improvement in Systems of Electrical Distribution, of which the following is a specification.

Our invention relates to systems of electrical distribution, and particularly to such systems as employ transformers for transforming two-phase electrical energy into three-phase energy; and it has for its object to provide simple and efficient means for varying and regulating the voltage delivered to the three-phase side of the system.

Series transformers have heretofore been used in connection with raising or lowering transformers in single-phase, two-phase, and three-phase transmission systems for the purpose of varying the voltage delivered to the distributing-mains, and the regulating means employed have been comparatively simple. The employment of series regulating-transformers on the three-phase side of a bank of two or more transformers which are so connected as to change two-phase currents to three-phase currents presents a more difficult problem; and it is the object of this invention to provide a suitable and satisfactory means for effecting the desired voltage regulation.

Figure 1:
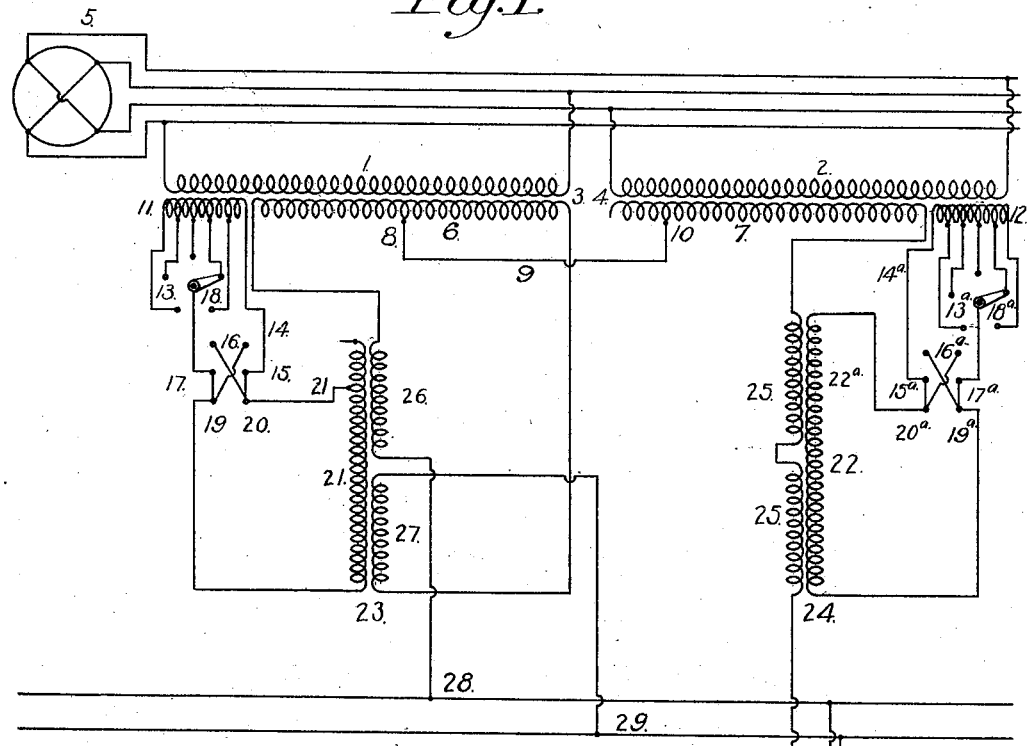
Figure 2:
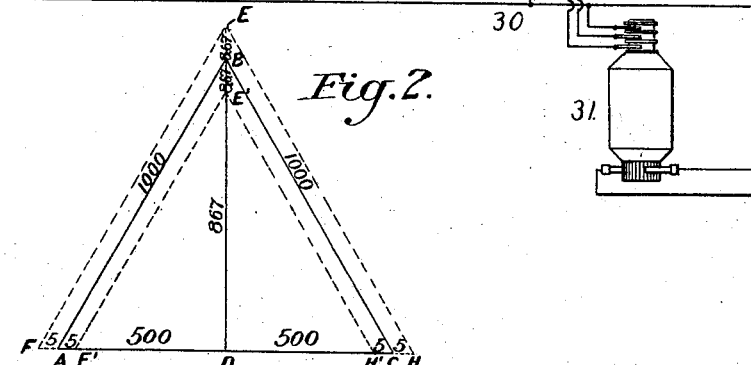

Our invention is illustrated in the accompanying drawings, Figure 1 of which is a diagram of a system of electrical distribution constructed in accordance therewith, and Fig. 2 is a geometrical diagram of the phase relations and values of the voltages in the system.

Two-phase currents are supplied to the primary windings 1 and 2 of the main transformers 3 and 4 by a generator 5, secondary windings 6 and 7 being connected in a manner well known in the art for converting two-phase energy into three-phase energy by means of two transformers. The middle point 8 of the secondary winding 6 is connected, by means of a suitable conductor 9, to a point 10, which is substantially 13.3 per cent. from one end of the secondary winding 7, the 13.3 per cent. of the winding remaining idle. Instead of having an idle section of winding the entire length of the secondary 7 might be substantially 86.70 per cent. of the length of the winding 6. The transformers 3 and 4 are also provided with auxiliary windings 11 and 12, a suitable number of spaced leads or taps being brought out from said windings and secured to contact terminal pieces on suitable regulator-dials 13 and $13^a$. The respective inner end terminals 14 and $14^a$ of the auxiliary windings are connected to the points 15 and $15^a$ of double-throw reverser-switches 16 and $16^a$, the points 17 and $17^a$ of which are connected to the contact-arms 18 and $18^a$ of the regulator-dials 13 and $13^a$.

Although we have shown the dials 13 and $13^a$ separately, the arms 18 and $18^a$ may be mechanically connected so as to be moved in unison by a single operating means, or the contact-pieces may all be placed on the same dial and the two arms connected so as to move simultaneously, such arrangements being well known in the art. If rotary converters are to be operated from the transformers, the arms 18 and $18^a$ should be so moved relatively to each other that the circuits through the auxiliary secondary windings 11 and 12 will not be interrupted at the same time, in order that the rotary converters may be prevented from falling out of synchronism.

The points 19 and 20 and $19^a$ and $20^a$ of the respective reverser-switches are connected to the proper terminals of the respective primary windings 21 and 22 of corresponding series transformers 23 and 24. The terminals of the secondary winding 25 of the series transformer 24 are connected, respectively, to one terminal of the secondary winding 7 of the main transformer 4 and to a distributing-conductor 30, and the two halves 26 and 27 of the secondary winding of the series transformer 23 have their outer terminals respectively connected to the terminals of the secondary winding 6 of the main transformer 3 and their inner terminals respectively connected to distributing-conductors 28 and 29. The energy from the secondary windings is delivered, through the three-phase distributing-mains 28, 29, and 30, to one or more rotary converters 31 or other suitable translating devices.

If the series transformers 23 and 24 have the same ratio of transformation, then on moving the arms 18 and 18$^a$ over the contacts on the dials 13 and 13$^a$ the voltage between the conductors 28 and 30 and 29 and 30 will increase or decrease, according to the position of the reverser-switch, more rapidly than the voltage between the conductors 28 and 29. To avoid this, we make the active length of the winding 21 of the series transformer 23 .867 of the active length of the winding 22 of the series transformer 24.

If it is desired to have the series transformers 23 and 24 alike, taps 21$^a$ and 22$^a$ may be brought out from their respective primary windings at points which are located .867 of the length of each winding from one of the ends thereof, as indicated.

The point 20 of the reverser-switch 16 is connected to the tap 21$^a$ in the primary 21 of the series transformer 23, and the end terminal is connected to the point 19, so that only .867 of the primary winding is utilized. On the other hand, the end terminals of the winding 22 of the series transformer 24 are respectively connected to the contact-terminals 19$^a$ and 20$^a$ of the reverser-switch 16$^a$, so that the whole of the primary winding 22 of the series transformer 24 is utilized.

It will be understood that the windings 21 and 22 of the series transformers 23 and 24 may be designed and constructed especially for this service by making the entire length of the winding 21 .867 of the entire length of the winding 22, if desired.

The reversing-switches 16 and 16$^a$ are provided in order that the voltages of the secondaries of the series transformers 23 and 24 may, as desired, be added to or subtracted from the voltage derived from the secondaries of the main transformers.

The phase relations of the voltages in the main and auxiliary transformer-windings may be understood from a consideration of the diagram shown in Fig. 2. A C represent the voltage supplied by the winding 6 and B D that supplied by the winding 7, which, for example, may be taken as one thousand and eight hundred and sixty-seven volts, respectively. These windings are connected in the well-known manner for the conversion of two-phase energy into three-phase energy, as described in Patent No. 521,051, granted to C. F. Scott June 5, 1894. The resultant three-phase voltages A B, B C, and A C are then each one thousand. By adding the lines A F and C H, representing the voltages in the auxiliary coils 26 and 27, respectively, to opposite ends of the line A C and the line B E, representing the auxiliary voltage added in coils 25, to the line D B the resultant three-phase voltages will be increased, as represented by the lines F E, E H, and H F, provided the ratios of A F and C H to B E are as 5 to 8.67. It is evident that the resultant voltages may also be reduced in a similar manner by subtracting voltages represented by the lines A F', B E', and C H'.

It is evident from the foregoing description and the drawings that we have provided a simple and efficient means whereby the voltage may be varied on the three-phase side of a system of distribution when transformers are employed for the conversion of two-phase into three-phase electrical energy. It is to be also understood that separate transformers having primary and secondary windings may be employed instead of placing auxiliary secondary windings 11 and 12, respectively, in the same magnetic circuits as the windings 6 and 7.

We claim as our invention—

1. In a system of electrical distribution, the combination with a source of two-phase energy and conductors for the transmission of said energy, of two transformers having main secondary windings the lengths of which have the ratio of 1 to .867 and are connected in the usual manner for the conversion of two-phase into three-phase electrical energy and having auxiliary secondary windings the active lengths of which may be varied, series transformers having their secondary windings respectively in series with the main secondary windings and having primary windings the active lengths of which have the ratio of .867 to 1, and means for connecting variable lengths of the auxiliary secondary windings of the main transformers in series with the proper primary windings of the series transformers so that voltage is either added to or subtracted from the main voltage in the three-phase secondary circuit.

2. In a system of electrical distribution, the combination with a source of two-phase energy and two main transformers having their primary windings connected to said source and having secondary windings the length of one of which is substantially .867 that of the other and has one of its end terminals connected to the middle point of the other and having auxiliary secondary windings provided with spaced leads, of distributing-conductors, regulating-transformers one of which has its secondary-winding terminals connected, respectively, to one terminal of the shorter main-transformer secondary and the other terminal to one of the distributing-conductors and the other of which has two secondary windings connected by their outer terminals to the respective terminals of the longer secondary winding of the main transformer and by their inner terminals to the second and third distributing-conductors and a primary winding the length of which is .867 that of the primary winding of the other regulating-transformer and means for connecting variable lengths of the auxiliary secondary windings of the main transformer in series with the primary windings of the regulating-transformers.

3. In a system of electrical distribution, the combination with a source of two-phase energy and transformers for transforming the energy supplied thereby into three-phase energy, of regulating-transformers having their secondary windings connected in series with secondary windings of the main transformers and having primary windings the active lengths of which have the ratio of .867 to 1, two auxiliary transformer-windings and means for connecting variable lengths of the same in series with the respective primary windings of the regulating-transformers.

4. In a system of electrical distribution, the combination with a source of two-phase energy and main transformers for transforming such energy into three-phase energy, of means for varying the electromotive force of the three-phase energy comprising two regulating series transformers the lengths of the primary windings of which have substantially the ratio of .867 to 1, two variable-voltage windings on the main transformers and means for connecting different lengths of the same in series with the respective primary windings of the regulating-transformers.

5. In a system of electrical distribution, the combination with a source of two-phase energy and two transformers each of which has a main and an auxiliary secondary winding and the length of one of the main secondary windings of which is .867 that of the other and has one terminal connected to the middle point of the other, of a three-phase distributing-circuit, two series regulating-transformers corresponding to the main transformers and having primary windings the lengths of which have a ratio of 1 to .867, a switch for varying the active length of the auxiliary winding of each main transformer and a reversing-switch for connecting the active length of such auxiliary winding in series with the primary winding of the corresponding regulating-transformer so as to either raise or lower the electromotive force of the main secondary circuit.

6. In a system of electrical distribution, the combination with a source of two-phase energy and two main transformers having their primaries connected to said source and having both main and auxiliary secondary windings the lengths of the former of which have a ratio of .867 to 1, of regulating-transformers having secondary windings in series with the main secondary windings of the main transformers and having primary windings the lengths of which have a ratio of 1 to .867 and switching devices for connecting said primary windings in series with variable lengths of the auxiliary windings of the main transformers.

7. In a system of electrical distribution, the combination with a source of two-phase energy, of two transformers having their primary windings connected to said source and having both main and auxiliary secondary windings the former of which have a ratio of .867 to 1 and one terminal of the shorter winding being connected to the middle point of the longer, a three-phase distributing-circuit, a regulating-transformer having a secondary winding connected between one terminal of the main secondary and one of the distributing-conductors and having another secondary winding connected between the other terminal of the main secondary and a second distributing-conductor, a second regulating-transformer having its secondary winding connected between one terminal of the shorter main secondary winding and the third distributing-conductor and switching devices connected between the variable auxiliary secondary windings of the main transformers and the corresponding primaries of the regulating-transformers, the active lengths of the primary windings of said regulating-transformers having the ratio of .867 to 1.

8. In a system of electrical distribution, the combination with a source of two-phase energy and main transformers having their primary windings connected to said source and secondary windings the lengths of which have a ratio of .867 to 1 and one terminal of the shorter winding being connected to the middle point of the longer winding, of a three-phase distributing-circuit, regulating-transformers having their secondary windings respectively connected in series with the secondary windings of the main transformers and having primary windings the active lengths of which have a ratio of 1 to .867, means for applying a variable voltage to the terminals of the primary windings of said regulating-transformers and means for reversing the direction of said variable voltage.

In testimony whereof we have hereunto subscribed our names this 17th day of June, 1903.

JOHN S. PECK.
JOSEPH W. FARLEY.

Witnesses:
W. H. THOMPSON,
BIRNEY HINES.